Oct. 23, 1956     B. F. ARPS     2,767,491
SCRAPER ATTACHMENT FOR TRACTORS
Filed July 7, 1954     4 Sheets-Sheet 1

INVENTOR.
BRUNO F. ARPS
BY a.S.Kroob

Oct. 23, 1956        B. F. ARPS        2,767,491
SCRAPER ATTACHMENT FOR TRACTORS
Filed July 7, 1954        4 Sheets-Sheet 2
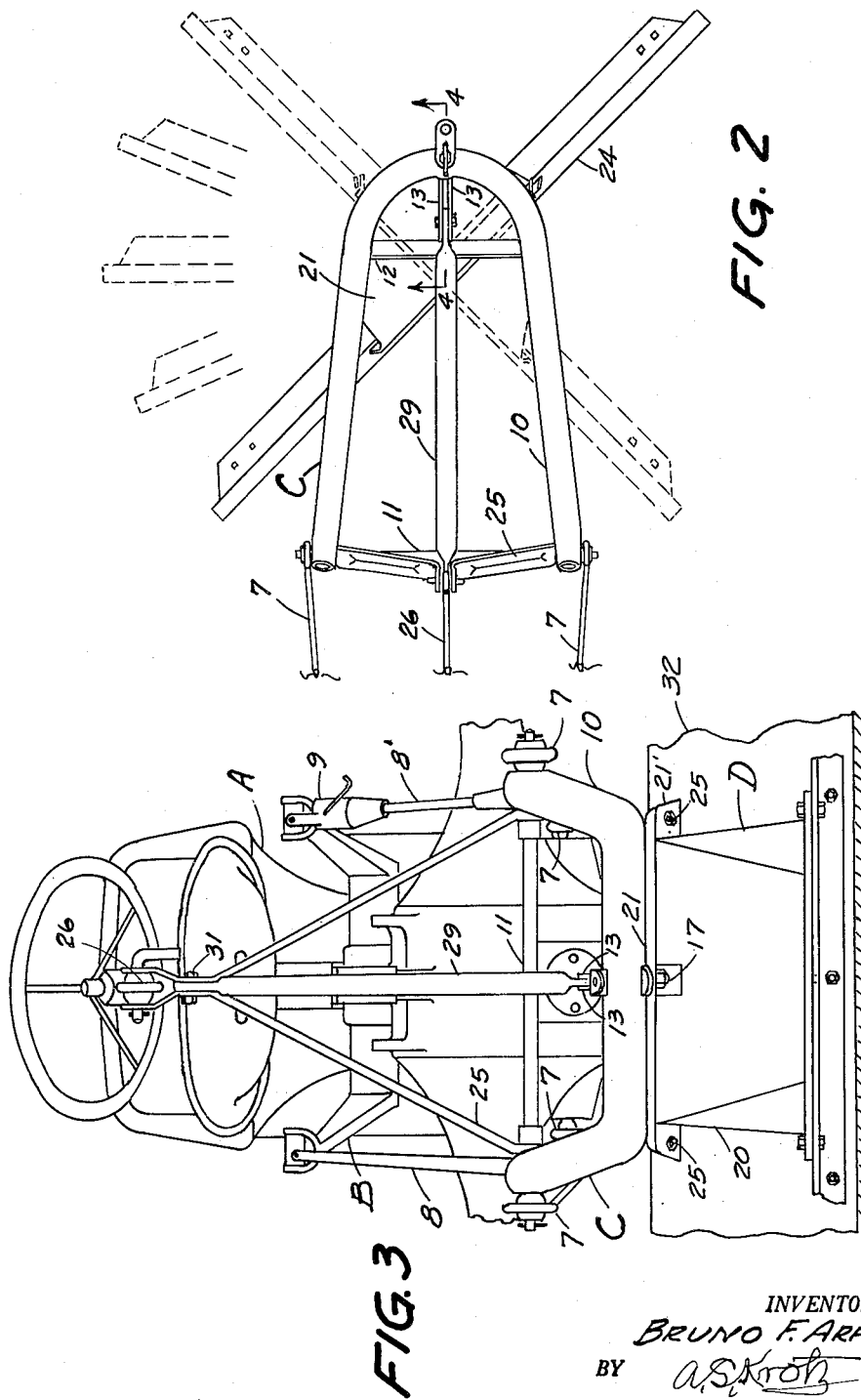
INVENTOR.
BRUNO F. ARPS
BY a.s. Kroh Oct. 23, 1956  B. F. ARPS  2,767,491
SCRAPER ATTACHMENT FOR TRACTORS
Filed July 7, 1954  4 Sheets-Sheet 3

INVENTOR.
BRUNO F. ARPS
BY

United States Patent Office 2,767,491
Patented Oct. 23, 1956

2,767,491

SCRAPER ATTACHMENT FOR TRACTORS

Bruno F. Arps, New Holstein, Wis., assignor to Arps Corporation, New Holstein, Wis.

Application July 7, 1954, Serial No. 441,900

2 Claims. (Cl. 37—159)

The present invention relates to a novel scraper attachment, especially adapted to be attached to the rear end of a standard type tractor and is an improvement over my co-pending application Serial #430,147, filed May 17, 1954, and has specific reference to the scraper holding frame which is attached to the tractor as in said co-pending application.

The present invention relates to the scraper blade frame including the scraper holding bracket and refers to a design which can be built at low cost, is simple and on which the blade can be easily adjusted to different positions, both for forward and rearward movement of the tractor.

Designs of the present character because of the rough service required must be sturdy, of few parts and wherever possible the parts should be welded together in order to avoid the loosening effects of excessive vibration.

Since the present invention relates only to the main frame and blade carrying bracket, its attachment to the tractor being similar to that shown in said co-pending application, it is thought unnecessary to show in this application similar parts.

Therefore all of the parts involving invention or improvements over said co-pending application will be shown in detail and carefully described and claimed.

To these and other useful ends my invention consists of parts, combinations of parts or their equivalents and mode of operation as hereinafter described and claimed and shown in the accompanying drawings in which:

Fig. 2 is a top view of my device showing a fraction only of the rear ends of the tractor draw bars and the stabilizing bar.

Fig. 3 is a fractional rear view of my device including a fraction of the tractor.

Figure 1:
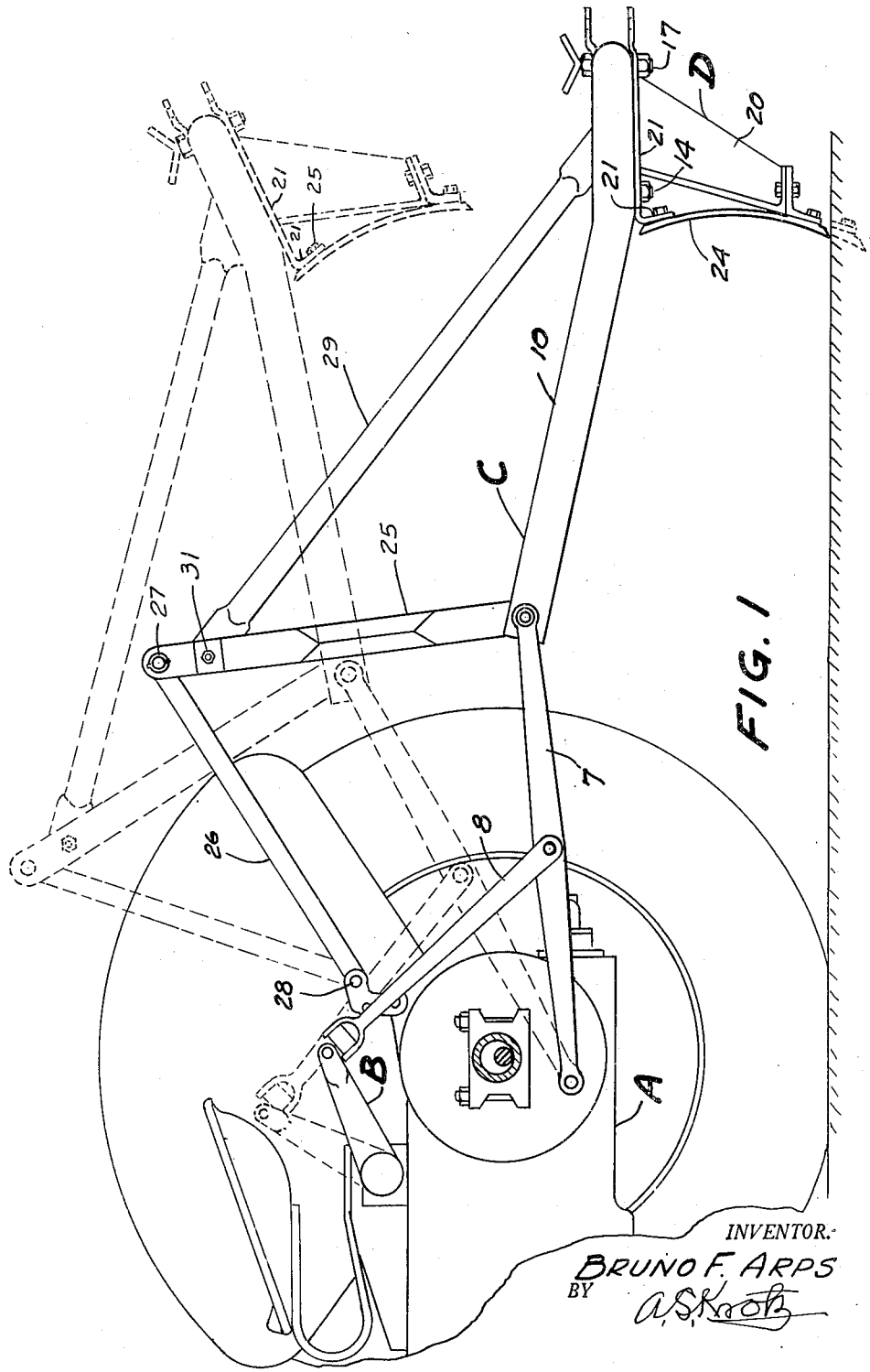
Fig. 1 is a side elevational view of my invention shown as attached to a fraction of a conventional tractor.
Figure 4:
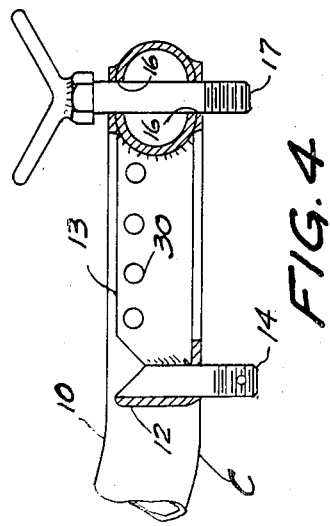
Fig. 4 is a sectional view taken on line 4—4 of Figure 2.

It will be seen from the foregoing that the present device can act as a substitute for the scraper holding frame and blade bracket shown in said co-pending application because it can be readily attached to the rear ends of the draw bars and stabilizing link shown in said co-pending application.

In the drawings the tractor is designated in its entirety by reference character A and the power lift by reference character B, the scraper frame by reference character C and the scraper holding bracket is in its entirety designated by reference character D. Tractor A has two spaced apart draw bars 7 each having a connection 8 and 8' to the power lift B (see Figure 3). Member 8' has manually controlled means 9 for changing the length of this member. Member 8 may also have a member 9 on its forward end each for the purpose of tilting scraper frame C for an obvious purpose as illustrated in said co-pending application.

Member C comprises preferably a tube member 10 bent in the form shown in Figures 1, 2, and 3, its front ends being connected together by cross frame member 11 and its rear end having secured thereto a cross brace member 12. This member 12 and the rear end of member 10 have secured thereto two closely spaced apart brackets 13—13. Member 12 has secured thereto a depending bolt 14 and member 10 has an opening 16 for the free reception of a bolt 17.

The scraper holding bracket 20 per se has secured to its upper end a plate 21 (see Figures 1, 5, 6 and 7), having a number of spaced holes 22 for the reception of either bolts 14 or 17. Member 21 also has a slot 23 for the free reception of bolts 14 or 17 for its length. Openings 22 are on a radius with the front end of slot 23 and the front end of slot 23 is on the same radius with the rear end of this slot so that bracket D may be adjusted on member 10 as follows:

The front ends of member 10 have hingedly secured thereto an upwardly extending frame 25, the upper end of which has hingedly secured thereto the rear end of a stabilizing bar 26 as at 27, member 26 at its front end is hinged to the frame of the tractor as at 28. A brace bar 29 is at its rear end adapted to be connected to any one of openings 30 in members 13, its front end being hingedly secured to member 25 as at 31. Member 29 is adapted to raise or lower the rear end of member 10 relative to its front end by changing its connection to members 13.

Figure 6:
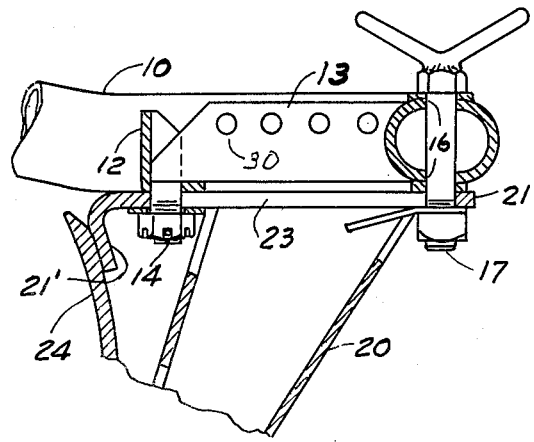
Fig. 6 is a fractional side view showing the blade holding bracket and a portion of the holding frame partly in section.

When the scraper holding bracket D is in the position shown in Figures 1 and 6 bolt 14 acts as a radius on which the scraper bracket may be turned at different angles and locked in the position by bolt 17. This position may be either transverse to the direction of travel or to any angle in either direction as shown in Figure 2.

Thus I have provided a convenient means for firmly and adjustably attaching the scraper holding bracket D to frame C wherein this bracket may be adjusted for scraper operation as illustrated in full and dotted lines in Figure 2.

Figure 7:
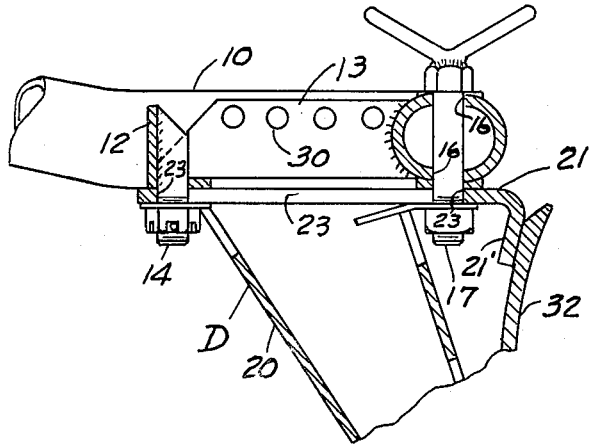
Fig. 7 is a fractional side elevational view similar to Figure 6 except showing the blade holding bracket reversed for bull-dozing operations.

I have however provided means as illustrated whereby the scraper holding bracket D may be reversed as shown in Figure 7 for use as a bull-dozer either with the scraper at right angles to the direction of travel or at any desired angle, as illustrated in Figure 2.

Figure 5:
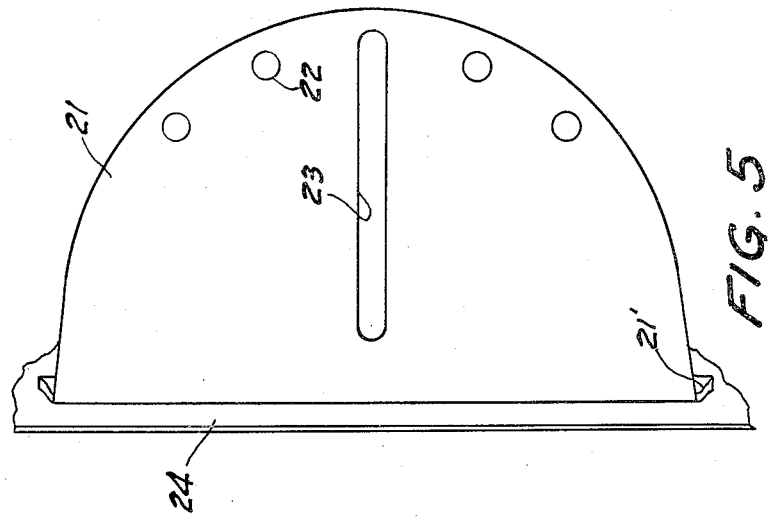
Fig. 5 is a top view of the blade holding bracket as shown in Figure 1 and as shown fractionally in Figures 6 and 7.

Novel features of applicant's device are the means provided for holding the scraper holding bracket D to the scraper frame and for adjusting the angle of the scraper blade 32 on frame C and for reversing the scraper bracket for bull-dozer operations, the latter being as follows:

Referring to Figures 5, 6 and 7; it will be noted that the front end of slot 23 is positioned so openings 22 are radial with the front end of this slot. Thus clearly as illustrated in Figures 2 and 6 depending bolt 14 will act as a hinge upon which bracket D is turned to the right or left. To provide the same adjustment for bracket D when reversed for bull-dozer operations, all that is necessary is to loosen bolt 17, remove the nut on bolt 14 and disengage bolt 14 from plate 21, after which bracket D may be reversed and moved to the position shown in Figure 7 and secured to member C by tightening the nuts on bolts 14 and 17, leaving the scraper blade 32 in a transverse position to the direction of travel. To change the angle of scraper blade 32 all that is necessary is to remove the nut on bolt 14 and loosen the nut on bolt 17, tip plate 21 out of engagement with bolt 14 and move the bracket to whatever angle is desired and then resecure bracket D to member C.

It will be noted that the front edge of member 21 is turned downwardly forming a seat 21' for scraper blade 32 to which the scraper blade is attached by bolts as at 25 (see Figure 3). The lower edge of scraper blade 32 is suitably secured to member 20 as illustrated in Figure 3 or otherwise.

Thus it will be seen that changing the angle of the scraper blade as illustrated in Figure 2 is a comparatively simple matter and that if necessary, altho infrequent, the angle of the scraper blade may be changed when in a reversed position as shown in Figure 2.

It will be seen that applicant's device is strong, easily adjusted and easily built at low cost, and that many minor detail changes may be made without departing from the spirit and scope of the appended claims.

Having thus shown and described my invention, I claim:

1. In a scraper attachment for tractors having transversely spaced rearwardly extending draw bars and a power lift having operating connections to said draw bars comprising in combinaiton, a scraper frame bent into a generally U shape having hingedly secured to its front ends the rear ends of said draw bars, an upwardly extending frame member transversely hinged at its lower ends to the forward ends of said scraper frame, its upper end having a stabilizing link hinged connection to the frame of the tractor a distance above the forward end of said draw bars, a brace bar forming an adjustable connection between the rear end of said scraper frame and near the upper end of said upwardly extending frame member for changing the height of the rear end of said scraper frame member relative to its front end, a transverse brace member secured to said scraper frame near the rear end thereof and having secured thereto a depending bolt secured to the transverse center thereof, a scraper holding bracket having secured to its upper end a plate having a longitudinal slot for the free reception for its length of said depending bolt and having a number of spaced openings on its rear side positioned on a radius with the front end of said slot, an opening in the transverse rear center of said U shaped scraper frame for another bolt positioned to register with said spaced openings whereby the scraper holding bracket may be positioned transversely or at angles to the direction of travel and locked into position by said depending and other bolt.

2. In a scraper attachment for tractors having transversely spaced rearwardly extending draw bars and a power lift having operating connections to said draw bars comprising in combination, a scraper frame having hingedly secured to its front ends the rear ends of said draw bars, an upwardly extending frame member transversely hinged at its lower ends to the forward ends of said scraper frame, a brace bar forming an adjustable connection between the rear end of said scraper frame and near the upper end of said upwardly extending frame member for changing the height of the rear end of said scraper frame member relative to its front end, a transverse brace member secured to said scraper frame near the rear end thereof and having secured thereto a depending bolt secured to the transverse center thereof, a scraper holding bracket having secured to its upper end a plate having a longitudinal slot for the free reception for its length of said depending bolt and having a number of spaced openings on its rear side positioned on a radius with the front end of said slot, an opening in the transverse rear center of said scraper frame for another bolt positioned to register with said spaced openings whereby the scraper holding bracket may be positioned transversely, or at angles to the direction of travel, or reversed and locked into position by said bolts.

References Cited in the file of this patent

UNITED STATES PATENTS 2,560,711    Arps    July 17, 1951